United States Patent
Ma et al.

(10) Patent No.: US 8,276,194 B2
(45) Date of Patent: Sep. 25, 2012

(54) METHODS AND SYSTEMS FOR USER AUTHENTICATION

(75) Inventors: Yuzhi Ma, Shenzhen (CN); Fuyou Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 406 days.

(21) Appl. No.: 12/511,807

(22) Filed: Jul. 29, 2009

(65) Prior Publication Data

US 2009/0300743 A1 Dec. 3, 2009

Related U.S. Application Data

(63) Continuation of application No. PCT/CN2008/070228, filed on Jan. 31, 2008.

(30) Foreign Application Priority Data

Feb. 1, 2007 (CN) .......................... 2007 1 0002829

(51) Int. Cl.
*H04L 9/32* (2006.01)
*H04L 29/06* (2006.01)
*H04L 12/28* (2006.01)
*G06F 7/04* (2006.01)
*G06F 21/00* (2006.01)
*G06F 17/00* (2006.01)
*H04L 12/24* (2006.01)
*G06F 17/30* (2006.01)

(52) U.S. Cl. ................... 726/4; 726/3; 726/6; 713/168; 713/182; 370/254; 707/702

(58) Field of Classification Search ................ 726/4, 6, 726/3; 707/2; 370/254
See application file for complete search history.

(56) References Cited

U.S. PATENT DOCUMENTS
2006/0070116 A1 3/2006 Park
(Continued)

FOREIGN PATENT DOCUMENTS
CN 1581795 A 2/2005
(Continued)

OTHER PUBLICATIONS

Florian Kohlmayer, Hannes Tschofenig, Rainer Falk, Rafa Marin Lopez, Santiago Zapata Hernandez, Pedro García Segura, Antonio F. Gómez Skarmeta; "GSABA: a generic service authorization architecture"; Dec. 2006; MobiArch '06: Proceedings of first ACM/IEEE international workshop on Mobility in the evolving internet architecture; pp. 51-56.*

(Continued)

*Primary Examiner* — Eleni Shiferaw
*Assistant Examiner* — Courtney Fields
(74) *Attorney, Agent, or Firm* — Finnegan, Henderson, Farabow, Garrett & Dunner LLP (57) ABSTRACT

Method and systems for user authentication are provided according to the embodiments of the invention. The method mainly includes: sending, by a management station, an authentication request message of an authentication protocol to a managed device via a management protocol, and sending user authentication information to the managed device; and authenticating the user by the managed device via the authentication protocol or a authentication server based on the received user authentication information, and returning an authentication acknowledgement message of the authentication protocol carrying the authentication result to the management station via the management protocol. The system mainly includes a management station and a managed device; or, a management station, a managed device and a backend authentication server. With the present invention, methods and systems for user authentication with a good extensibility and a widened application are provided.

7 Claims, 3 Drawing Sheets

U.S. PATENT DOCUMENTS

| | | | |
|---|---|---|---|
| 2006/0161519 A1* | 7/2006 | Stewart et al. | 707/2 |
| 2008/0141031 A1* | 6/2008 | Oba et al. | 726/3 |
| 2009/0154374 A1* | 6/2009 | Jaatinen | 370/254 |

FOREIGN PATENT DOCUMENTS

| | | | |
|---|---|---|---|
| CN | 1628449 A | | 6/2005 |
| CN | 1716953 A | | 1/2006 |
| CN | 1756156 A | | 4/2006 |
| CN | 1889562 A | | 1/2007 |
| EP | 2166699 A1 | * | 3/2010 |
| KR | 20040054348 A | | 6/2004 |
| WO | 99/66400 A2 | | 12/1999 |

OTHER PUBLICATIONS

M. Wasserman et al. "Using the Netconf Configuration Protocol over Secure Shell (SSH)," Network Working Group, Internet-Draft, Mar. 6, 2006.

Written Opinion issued by the International Searching Authority on Apr. 3, 2008 in International Application No. PCT/CN2008/070228.

B. Aboba et al. "*RADIUS (Remote Authentication Dial in User Service) Support for Extensible Authentication Protocol (EAP).*" Request for Comments 3579, Network Working Group, Sep. 2003.

B. Aboba et al. "*Extensible Authentication Protocol (EAP),*" Request for Comments 3748, Network Working Group, Jun. 2004.

* cited by examiner

METHODS AND SYSTEMS FOR USER AUTHENTICATION

CROSS-REFERENCE TO RELATED APPLICATIONS

This application is a continuation of International Application No. PCT/CN2008/070228, filed Jan. 31, 2008, which claims the benefit of Chinese Patent Application No. 200710002829.5, filed Feb. 1, 2007, both of which are hereby incorporated by reference in their entireties.

FIELD OF THE INVENTION

The present invention relates to network communications, and more specifically, to methods and systems for user authentication.

BACKGROUND

The network management model of Simple Network Management Protocol (SNMP) includes a management station, a managed device, a management information base and a management protocol. The network management of SNMP includes two basic processes:

1. The management station performs reading and/or writing operations on the management information base in the managed device via the management protocol.

2. The managed device feeds the state information in its management information base back to the management station via the management protocol.

When the management station performs reading and/or writing operations on the managed device via the management protocol, it is required to perform identity authentication and access control authorization on the operating user, so as to ensure the validity of user operations.

A method, in the related art, for user identity authentication with a management protocol includes that the management protocol SNMPv3 itself provides the user authentication technique. The User-based Security Model (USM) of the SNMPv3 provides the identity authentication, message encryption and timestamp check. The message header of the SNMPv3 carries the parameters required by the USM, such as a username, authentication information, etc. When a transmitting end sends a message, the authentication information for the message is calculated by an authentication algorithm internal to the SNMPv3, and the resultant authentication information is filled into the message header. After the message is received by a receiving end, the same authentication algorithm is used to calculate the authentication information of the message, which is compared with the original authentication information carried in the message. If the comparison result represents being identical, then the authentication for the sending user passes.

During implementing the present invention, the inventors find that the above method in the related art has the following disadvantages:

1. This method is an authentication mechanism dedicated to SNMPv3, whereas this mechanism may not interoperate well with the existing protocols and facilities, thereby departing from the present development trends of the technique.

2. This method employs an authentication manner with an internal management protocol, and this authentication manner is fixed and with poor extensibility, and is inconvenient in supporting new authentication methods.

A method for user identity authentication in another management protocol in the related art includes that: in the Secure Shell (SSH) bearing of the Network Configuration Protocol (Netconf, an XML-based network configuration protocol), the user authentication manner of the SSH is used directly. The SSH protocol includes three parts. The Netconf/SSH client first establishes an SSH transmission connection by using the SSH transmission protocol, and then executes the SSH user authentication protocol to authenticate the user of the Netconf protocol. Then the client initiates the SSH connection service. The subsequent Netconf messages are borne in the SSH connection service.

During implementing the present invention, the inventors find that the above conventional method has the following disadvantages. This method authenticate the Netconf user with the user authentication mechanism internal to the SSH protocol. However, the SSH user and the Netconf user may not be matched. For example, if the data of multiple users is carried on one SSH connection, it is not appropriate to authenticate the users with this method unless the NETCONF protocol is modified significantly. Accordingly, this method may not be applied extensively.

SUMMARY

Methods and systems for user authentication are provided according to various embodiments of the present invention, which overcome the disadvantages of a poor extensibility and a relatively narrow application of the methods for user authentication with the existing management protocol.

The embodiments of the invention are implemented according to the following technique schemes.

A method for authenticating a user includes:

sending, by a management station, an authentication request message of an authentication protocol to a managed device via a management protocol, and sending user authentication information to the managed device; and authenticating, by the managed device, the user via the authentication protocol or an authentication server according to the received user authentication information, and returning an authentication acknowledgement message of the authentication protocol carrying an authentication result to the management station via the management protocol.

The management protocol includes an extensible markup language (XML)-based network configuration protocol (Netconf) or a simple network management protocol (SNMP). The authentication protocol includes an extensible authentication protocol (EAP).

The sending of the authentication request message or authentication acknowledgement message of the authentication protocol via the management protocol includes:

adding an operation type for user identity authentication and an XML tag for EAP authentication message encapsulation in the Netconf, encapsulating the authentication request message or authentication acknowledgement message of the EAP into the XML tag, and setting the XML tag in an operation associated with the operation type for user identity authentication.

The sending of the authentication request message or authentication acknowledgement message of the authentication protocol via the management protocol further includes:

setting an XML tag carrying user or user group identification, setting the user or user group identification in the XML tag, and setting the XML tag in a Netconf operation.

The sending of the authentication request message or authentication acknowledgement message of the authentication protocol via the management protocol includes:

adding a message type for user identity authentication in the SNMP, and encapsulating the authentication request message or authentication acknowledgement message of the EAP into a message associated with the message type for user identity authentication.

The sending of the authentication request message or authentication acknowledgement message of the authentication protocol via the management protocol includes:

setting user or user group identification information in a header of the message associated with the message type for user identity authentication.

The sending of the authentication request message or authentication acknowledgement message of the authentication protocol via the management protocol includes:

encapsulating the authentication request message or authentication acknowledgement message of the EAP into a variable binding list of an SNMP message.

The sending of the authentication request message or authentication acknowledgement message of the authentication protocol via the management protocol includes:

encapsulating the authentication request message or authentication acknowledgement message of the EAP in the management protocol by means of Attribute Value Pairs (AVP).

A system for authenticating a user includes:

a management station, configured to send an authentication request message of an authentication protocol to a managed device via a management protocol, send user authentication information to the managed device, and receive an authentication acknowledgement message of the authentication protocol sent from the managed device via the management protocol; and the managed device, configured to authenticate the user via the authentication protocol based on the user authentication information sent from the management station, and send the authentication acknowledgement message of the authentication protocol carrying an authentication result to the management station via the management protocol.

A system for authenticating a user includes:

a management station, configured to send an authentication request message of an authentication protocol to a managed device via a management protocol, send user authentication information to the managed device, and receive an authentication acknowledgement message of the authentication protocol sent from the managed device via the management protocol;

the managed device, configured to send the user authentication information sent from the management station to a backend authentication server by an Authentication, Authorization and Accounting (AAA) protocol, convert an authentication result returned from the backend authentication server into the authentication acknowledgement message of the authentication protocol, and send the authentication acknowledgement message to the management station via the management protocol; and the backend authentication server, configured to receive the user authentication information sent from the managed device, authenticate the user according to the user authentication information, and return the authentication result to the managed device.

A system for authenticating a user includes:

a management station, configured to send an authentication request message of an authentication protocol to a managed device via a management protocol, sending user authentication information to the managed device, and receive an authentication acknowledgement message of the authentication protocol, where the authentication acknowledgement message is returned from the managed device to the management station via the management protocol after the user is authenticated by the managed device or a backend authentication server.

A system for user authentication includes:

a managed device, configured to authenticate the user via an authentication protocol according to user authentication information sent from a management station, and send an authentication acknowledgement message of the authentication protocol carrying an authentication result to the management station via a management protocol; or configured to send the user authentication information sent from the management station to a backend authentication server by an Authentication, Authorization and Accounting (AAA) protocol, convert an authentication result returned from the backend authentication server into an authentication acknowledgement message of the authentication protocol, and send the authentication acknowledgement message to the management station via the management protocol.

As apparent from the technique schemes provided above according to the embodiments of the present invention, in the embodiments of the present invention, the authentication request message or authentication acknowledgement message of the authentication protocol is sent via the management protocol, and a user is authenticated via the authentication protocol or the authentication server. Because new authentication methods may be extended conveniently in the authentication protocol, methods and systems for user authentication in the management protocol with a good extensibility are provided, thereby enriching the authentication methods of the management protocol.

DETAILED DESCRIPTION

Methods and systems for user authentication are provided according to the embodiments of the invention. The corresponding software according to the embodiments of the invention may be stored in a computer readable storage medium.

According to an embodiment of the invention, an authentication request message or authentication acknowledgement message of an authentication protocol is sent via a management protocol, and the various information required to authenticate a user is carried in the management protocol. The managed device authenticates the user using an authentication method provided by the authentication protocol or a backend authentication server.

The foregoing management protocol refers to a network management protocol such as the SNMP, Netconf, etc., and the foregoing authentication protocol includes an authentication protocol such as the Extensible Authentication Protocol (EAP), etc.

The method of sending the authentication request message or authentication acknowledgement message of the authentication protocol via the management protocol is associated with the specific management protocol, as will be illustrated by examples of the Netconf and SNMP protocols below.

If the management protocol is the Netconf protocol, the specific processing for encapsulating an EAP authentication message in the Netconf is as follows.

First, a new operation "identify" is added into the Netconf for user identity authentication, with the basic format as follows:

```
<rpc message-id="101"
xmlns="urn:ietf:params:xml:ns:netconf:base:1.0">
<identify>
<! -- parameters ... -->
</identify>
</rpc>
```

The parameters in the basic format of the operation "identify" above refer to the one or more parameters which are represented by Extensible markup language (XML) tags. In an embodiment of the invention, the above XML tags are used to encapsulate the EAP authentication message, with the format being defined as:

```
<eap>
<! -- EAP Packet --> //encapsulate the EAP authentication
message into the XML tag "eap"
</eap>
```

The message format used to encapsulate the EAP authentication message in the above operation "identify" is as follows:

```
<rpc message-id="101"
xmlns="urn:ietf:params:xml:ns:netconf:base:1.0">
<identify>
<eap>
<! -- EAP Packet -->
</eap>
<! - other parameters -->     //other parameters, for future extension
</identify>
</rpc>
```

The format of the response message for the above operation "identify" is as follows:

```
<rpc-reply message-id="101"
xmlns="urn:ietf:params:xml:ns:netconf:base:1.0">
<eap>
<! -- EAP Response Packet -->     //EAP response message
</eap>
<! - other parameters -->     //other parameters, for future extension
</rpc-reply>
```

For an identity authenticated user, the user identity information may be carried in the subsequent management operations. Presently, the Netconf does not have the related definition. A new XML tag "identity" is defined according to an embodiment of the invention, for carrying a user or user group tag in the Netconf operations. The format of the XML tag "identity" is as follows:

```
<identity>
<! - user or user group ID --> // user or user group identification
```

-continued

```
<! - other contents -->     //other information relating to user or user group
</identity>
```

An example of using the above XML tag "identity" in the Netconf deletion operation is as follows:

```
<rpc message-id="101"
xmlns="urn:ietf:params:xml:ns:netconf:base:1.0">
<delete-config>
<identity>
<! - user or user group ID -->     //user or user group identification
<! - other contents -->     //other information relating to user or user group
</identity>
<target>
<startup/>
</target>
</delete-config>
</rpc>
```

If the management protocol is the SNMP protocol, the specific processing for encapsulating the EAP authentication message in the SNMP is as follows.

First, a message type "Identify-PDU" for user identity authentication is added into the SNMP. The format of the new message type "Identify-PDU" is illustrated by an example of the SNMPv3, where the format of the message type "Identify-PDU" is shown in table 1 below.

TABLE 1

| SNMPv3 message header | PDU type | max-bindings | EAP encapsulation message |
|---|---|---|---|

In the format shown in table 1 above, the specific format of the SNMPv3 message header is defined by the SNMPv3 protocol; a new type "Identify-PDU" is added into the Protocol Data Unit (PDU) types; the max-bindings originally refers to the number of bindings in the message in SNMPv3, yet refers to the length of the EAP encapsulation message here; and the EAP encapsulation message represents the particular EAP authentication message, the specific format thereof is defined by the EAP protocol.

The SNMPv3 message header above may include user or user group identification information, for use by the identity authenticated user to perform subsequent management operations.

In a practical application, some existing message of the SNMP, such as the GetRequest-PDU (get request message), may be used for user identity authentication, and the EAP authentication message is encapsulated in the variable binding list, i.e. the EAP authentication message is encapsulated with a variable binding having the SNMP protocol type of OCTET STRING. Because the maximum length of the OCTET STRING variable type is 65535, while the length of the EAP authentication message may exceed this limit, one or more variable bindings may be required in encapsulation. The advantage of this scheme is that the message format defined in the SNMP standard is followed.

The EAP authentication message may be encapsulated in the management protocol by means of Attribute Value Pairs (AVP), each AVP including three fields: type, length and data, where the type is used to identify that the following data is EAP authentication protocol information, the length field identifies the length of the data field, and the data field is used to encapsulate the EAP authentication message. The EAP authentication message may be encapsulated into one or more AVPs according to the content size of the EAP authentication message, and then the AVP(s) may be borne on the management protocol.

Figure 1:
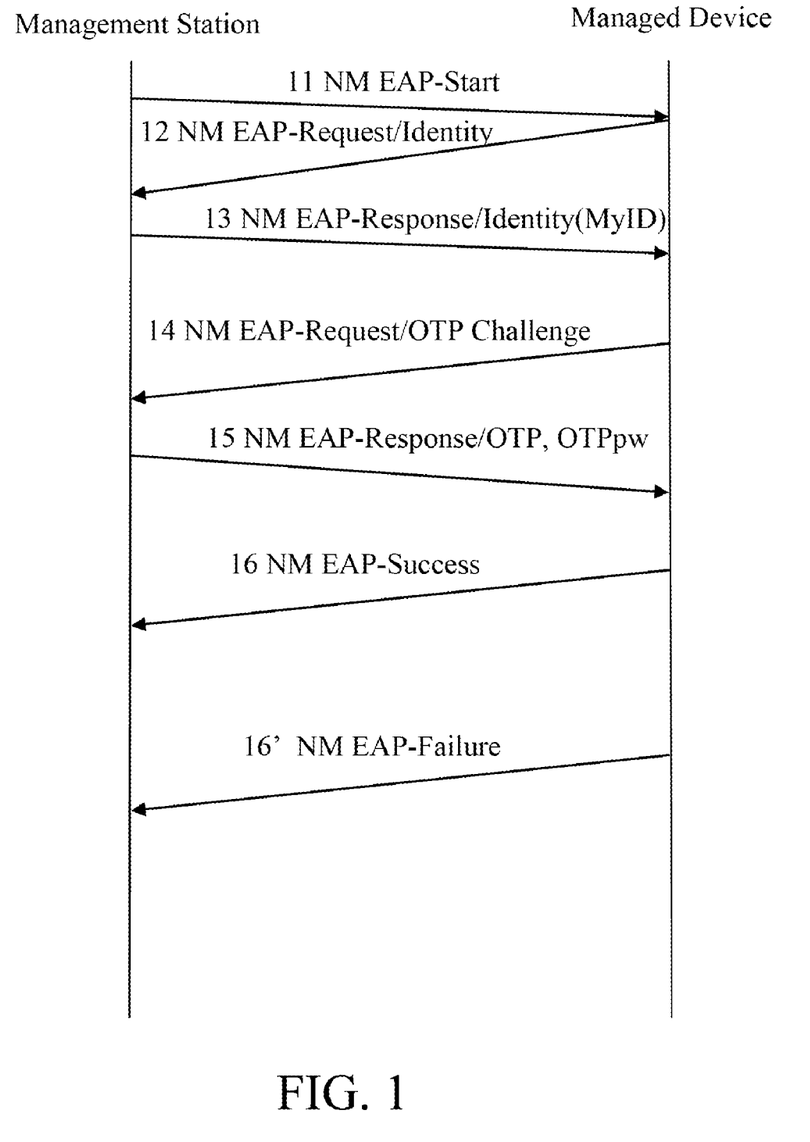
FIG. 1 is a flowchart of a method according to a first embodiment of the invention.

Taking the EAP as an example, the processing flowchart of a method according to a first embodiment of the invention is as illustrated in FIG. 1. The method includes the following steps.

At step 11, the management station sends an authentication start request message NM EAP-Start for a user to the managed device, where the message NM EAP-Start is encapsulated into an NM (Management Protocol). In the processing flowchart illustrated in FIG. 1, the EAP authentication messages delivered during the communication between the management station and the managed device are encapsulated into the NM.

At step 12, the managed device sends an identity identification request message NM EAP-Request/Identity to the management station upon receiving the message NM EAP-Start.

At step 13, the management station returns an identity identification response message NM EAP-Response/Identity (MyID) carrying MyID (user identity identification) to the managed device.

At step 14, the managed device sends an authentication challenge EAP message EAP-Request/OTP Challenge to the management station. The One Time Password (OTP) authentication is taken as an example here, while other authentication manners supported by the EAP may be employed in the practical applications.

At step 15, the management station returns an authentication acknowledgement message NM EAP-Response/OTP, OTPpw carrying the challenge password OTPpw to the managed device.

At step 16, the managed device performs the user identity authentication. The managed device performs the user identity authentication according to the obtained MyID and OTPpw. Upon successful authentication, the managed device returns an access accepted response EAP authentication message NM EAP-Success to the management station. Thereafter, the authenticated user may perform the subsequent management operations. If the above authentication fails, step 16' is performed.

At step 16', if the user identity authentication by the managed device fails, the managed device returns an access denied response EAP authentication message NM EAP-Failure to the management station. The user may not proceed with the subsequent management operations.

Figure 2:
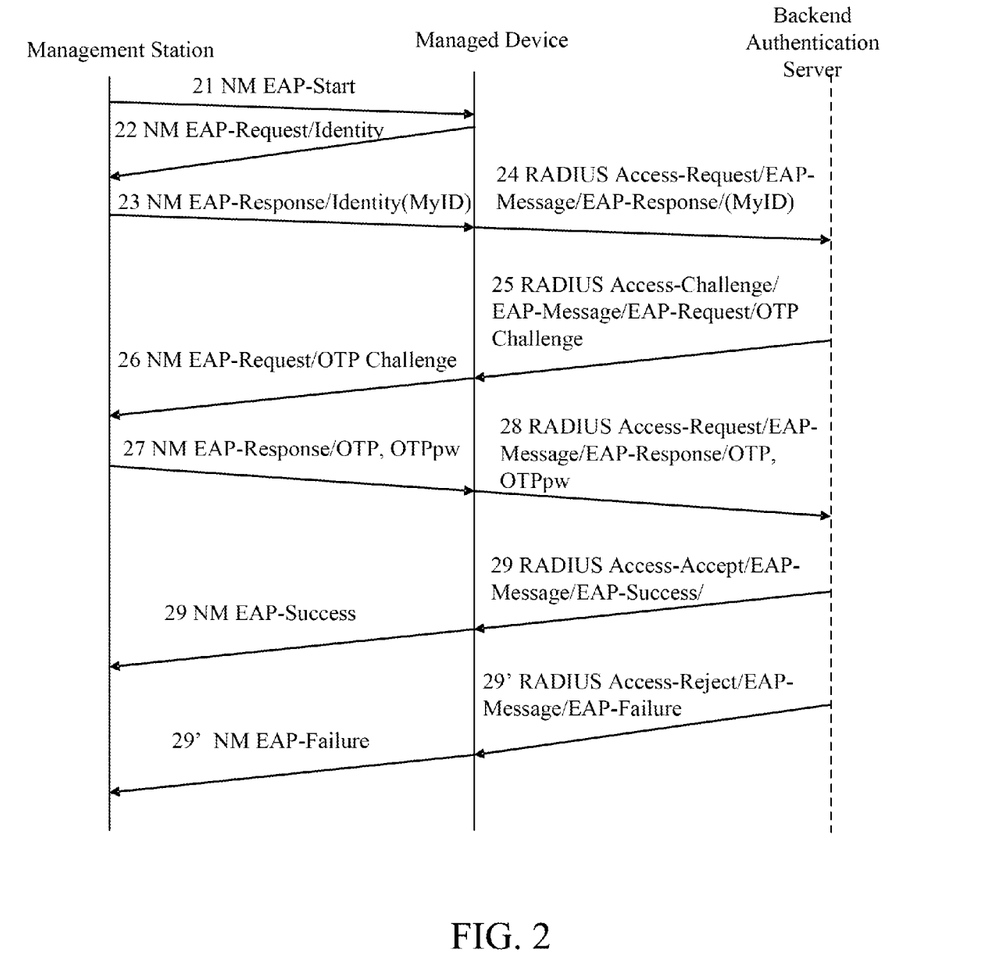
FIG. 2 is a flowchart of a method according to a second embodiment of the invention.

Taking the EAP as an example, the processing flowchart of a method according to a second embodiment of the invention is as illustrated in FIG. 2. The method includes the following steps.

At step 21, the management station sends an authentication start request message NM EAP-Start to the managed device, the message NM EAP-Start being encapsulated into an NM. The NM refers to a network management protocol such as the SNMP, NETCONF, etc. In the processing flowchart as illustrated in FIG. 2, the EAP authentication messages delivered during the communication between the management station and the managed device are encapsulated into the NM.

At step 22, the managed device sends an identity identification request message NM EAP-Request/Identity to the management station upon receiving the message NM EAP-Start.

At step 23, the management station returns an identity identification response message NM EAP-Response/Identity (MyID) carrying MyID (user identity identification) to the managed device.

At step 24, the managed device encapsulates the MyID with the EAP-Message attribute of the AAA (Authentication, Authorization and Accounting) protocol, and sends an access request EAP authentication message RADIUS Access-Request/EAP-Message/EAP-Response/(MyID) carrying the encapsulated MyID to a backend authentication server. The backend authentication server refers to an AAA server such as the Diameter, Radius, etc.

In the processing flowchart as illustrated in FIG. 2, the information carried in the EAP authentication messages delivered during the communication between the managed device and the backend authentication server are encapsulated by the EAP-Message attribute of the AAA protocol. The particular encapsulation method is defined by the AAA protocol. The existing AAA protocol has defined the method for encapsulating the EAP authentication message.

At step 25, the backend authentication server encapsulates the authentication manner into the EAP-Message attribute of the AAA protocol upon receiving the EAP message Access-Request, and sends an authentication challenge EAP message RADIUS Access-Challenge/EAP-Message/EAP-Request/OTP Challenge to the managed device. In the processing flowchart as illustrated in FIG. 2, the OTP authentication manner is taken as an example, while other authentication manners supported by the EAP or the backend authentication server may be employed in the practical applications.

At step 26, the managed device sends an authentication challenge EAP message NM EAP-Request/OTP Challenge to the management station. The OTP authentication is also taken as an example here, while other authentication manners supported by the EAP or the backend authentication server may be employed in the practical applications.

At step 27, the management station returns an authentication acknowledgement message NM EAP-Response/OTP, OTPpw carrying the challenge password OTPpw to the managed device.

At step 28, the managed device encapsulates the OTPpw into the EAP-Message attribute of the AAA protocol, and sends an access request EAP message RADIUS Access-Request/EAP-Message/EAP-Response/OTP,OTPpw carrying the encapsulated OTPpw to the backend authentication server.

At step 29, the backend authentication server performs the user identity authentication according to the obtained MyID and OTPpw upon receiving the access request EAP authentication message carrying the encapsulated OTPpw. Upon successful authentication, the backend authentication server returns an access accepted response EAP message RADIUS Access-Accept/EAP-Message/EAP-Success to the managed device. The managed device returns an access accepted response EAP authentication message NM EAP-Success to the management station. Thereafter, the authenticated user may perform the subsequent management operations. If the above authentication fails, step 29' is performed.

At step 29', if the user identity authentication by the backend authentication server fails, the backend authentication server returns an access denied response EAP message RADIUS Access-Reject/EAP-Message/EAP-Failure to the managed device, which in turn returns an access denied response EAP message NM EAP-Failure to the management station. The user may not proceed with the subsequent management operations.

Figure 3:
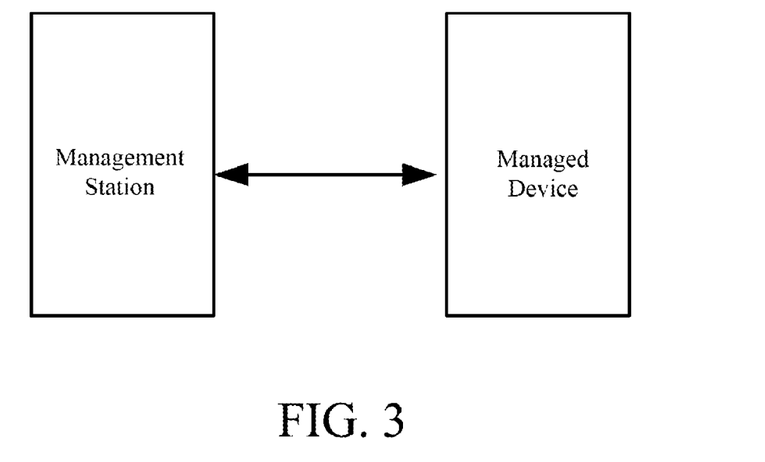
FIG. 3 is a schematic block diagram of a system according to the first embodiment of the invention.

In correspondence with the processing flowchart as illustrated in the first embodiment above, the architecture of a system according to the first embodiment of the invention is as illustrated in FIG. 3. The system includes: a management station, and a managed device.

The management station encapsulates an authentication protocol request message into a management protocol and sends it to the managed device; sends the user authentication information such as the user identity identification, authentication manner, etc., to the managed device; and receives an authentication protocol response message encapsulated in the management protocol returned from the managed device.

The managed device authenticates the user by using the authentication protocol based on the user authentication information sent from the management station, encapsulates the authentication protocol response message into the management protocol and returns it to the management station.

Figure 4:
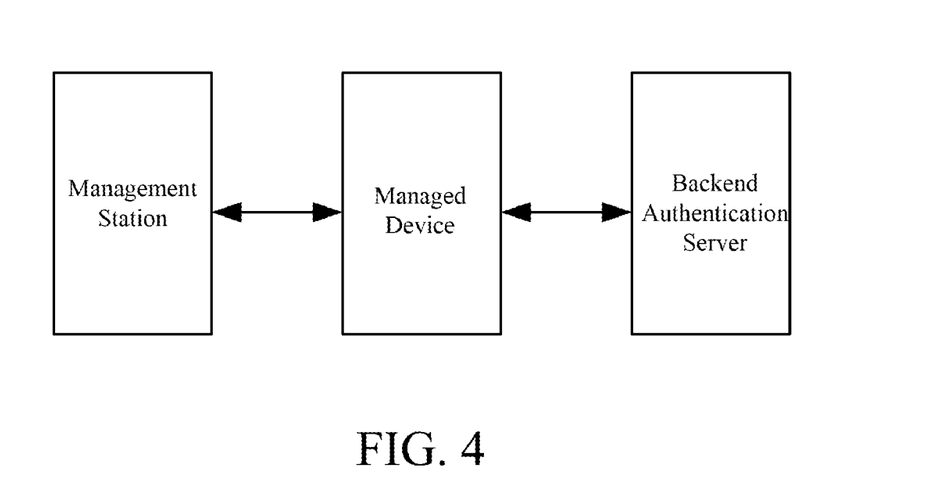
FIG. 4 is a schematic block diagram of a system according to the second embodiment of the invention.

In correspondence with the processing flowchart as illustrated in the second embodiment above, the architecture of a system according to the second embodiment of the invention is as illustrated in FIG. 4. The system includes: a management station, a managed device and a backend authentication server.

The management station encapsulates an authentication protocol request message into a management protocol and sends it to the managed device; sends the user authentication information such as the user identity identification, authentication manner, etc., to the managed device; and receives an authentication protocol response message encapsulated in the management protocol returned from the managed device.

The managed device encapsulates the user authentication information sent from the management station into the Authentication, Authorization and Accounting (AAA) protocol, and sends it to the backend authentication server; converts the authentication result returned from the backend authentication server into an authentication protocol response message, and encapsulates it into the management protocol so as to return to the management station.

The backend authentication server receives the user authentication information sent from the managed device, authenticates the user according to the user authentication information, and returns the authentication result to the managed device.

As described above, the EAP protocol is associated with the management protocol in the embodiments of the invention. Because the EAP protocol may extend new authentication methods, the authentication methods of the management protocol may be extended conveniently. The methods and systems according to the embodiments of the invention may be in combination with the AAA systems organically, and have a relatively wide applicable scope. In the embodiments of the invention, user authentication methods and systems with a good extensibility and a wide applicable scope are provided. The extensibility enriches the authentication methods of the management protocol.

The foregoing are merely exemplary embodiments of the present invention, while the scope of the present invention is not limited to such embodiments. Any variations or equivalents that may be readily conceived by those skilled in the art from the techniques disclosed by the present invention are intended to fall within the scope of the present invention. Therefore, the scope of the present invention should be determined by the scope of the claims.

What is claimed is:

1. A method for user authentication, comprising:
sending, by a management station, an authentication request message of an authentication protocol to a managed device via a management protocol, and sending user authentication information to the managed device; and
authenticating, by the managed device, the user via the authentication protocol or an authentication server according to the received user authentication information, and returning an authentication acknowledgement message of the authentication protocol carrying an authentication result to the management station via the management protocol;
wherein the management protocol comprises an extensible markup language (XML)-based network configuration protocol (Netconf) and the authentication protocol comprises an extensible authentication protocol (EAP); and
wherein the sending of the authentication request message or authentication acknowledgement message of the authentication protocol via the management protocol comprises:
adding, in the Netconf, an operation type for a user identity authentication and an XML tag for an EAP authentication message encapsulation;
encapsulating the authentication request message or authentication acknowledgement message of the EAP into the XML tag; and
setting the XML tag in an operation associated with the operation type for the user identity authentication.

2. The method of claim 1, wherein the sending of the authentication request message or authentication acknowledgement message of the authentication protocol via the management protocol further comprises:
setting an XML tag carrying a user identification or a user group identification, setting the user identification or the user group identification in the XML tag, and setting the XML tag in a Netconf operation.

3. The method of claim 1, wherein the sending of the authentication request message or authentication acknowledgement message of the authentication protocol via the management protocol comprises:
encapsulating the authentication request message or authentication acknowledgement message of the EAP in the management protocol by means of Attribute Value Pairs (AVP).

4. A system for user authentication, comprising:
a management station, configured to send an authentication request message of an authentication protocol to a managed device via a management protocol, send user authentication information to the managed device, and receive an authentication acknowledgement message of the authentication protocol sent from the managed device via the management protocol;
wherein the management protocol comprises an extensible markup language (XML)-based network configuration protocol (Netconf), and the authentication protocol comprises an extensible authentication protocol (EAP); and
wherein the management station is further configured to:
add, in the Netconf, an operation type for user identity authentication and an XML tag for EAP authentication message encapsulation;
encapsulate the authentication request message of the EAP into the XML tag: and
set the XML tap in an operation associated with the operation type for user identity authentication.

5. The system of claim 4, further comprising the managed device, configured to authenticate the user via the authentication protocol according to the user authentication information sent from the management station, and send the authentication acknowledgement message of the authentication protocol carrying an authentication result to the management station via the management protocol.

6. The system of claim 4, further comprising:
the managed device, configured to send the user authentication information sent from the management station to a backend verification server via an Authentication, Authorization and Accounting (AAA) protocol, convert an authentication result returned from the backend verification server into the authentication acknowledgement message of the authentication protocol, and send the authentication acknowledgement message to the management station via the management protocol; and
the backend verification server, configured to receive the user authentication information sent from the managed device, authenticate the user based on the user authentication information, and return the authentication result to the managed device.

7. A system for user authentication, comprising:
a managed device, configured to:
authenticate the user via an authentication protocol based on user authentication information sent from a management station, and send an authentication acknowledgement message of the authentication protocol carrying an authentication result to the management station via a management protocol; or
send the user authentication information sent from the management station to a backend authentication server via an Authentication, Authorization and Accounting (AAA) protocol, convert an authentication result returned from the backend authentication server into an authentication acknowledgement message of the authentication protocol, and send the authentication acknowledgement message to the management station via the management protocol;
wherein the management protocol comprises an extensible markup language (XML)-based network configuration protocol (Netconf), and the authentication protocol comprises an extensible authentication protocol (EAP); and
wherein the management station is configured to:
add, in the Netconf, an operation type for user identity authentication and an XML tag for EAP authentication message encapsulation;
encapsulate the authentication acknowledgement message of the EAP into the XML tag: and
set the XML tag in an operation associated with the operation type for user identity authentication.

* * * * *

UNITED STATES PATENT AND TRADEMARK OFFICE
CERTIFICATE OF CORRECTION

| | |
|---|---|
| PATENT NO. | : 8,276,194 B2 |
| APPLICATION NO. | : 12/511807 |
| DATED | : September 25, 2012 |
| INVENTOR(S) | : Yuzhi Ma and Fuyou Miao |

It is certified that error appears in the above-identified patent and that said Letters Patent is hereby corrected as shown below:

In claim 4, column 10, line 62, "XML tap" should read -- XML tag --

Signed and Sealed this
Twenty-sixth Day of February, 2013

Teresa Stanek Rea
*Acting Director of the United States Patent and Trademark Office*